March 25, 1969 W. J. ADLAF 3,434,246
POWER DRIVEN TOOL-POSITIONING MECHANISM
Filed April 27, 1966

INVENTOR
WILLIAM J. ADLAF
by: Spector & Alster
ATTYS.

United States Patent Office 3,434,246
Patented Mar. 25, 1969

3,434,246
POWER DRIVEN TOOL-POSITIONING
MECHANISM
William J. Adlaf, North Riverside, Ill., assignor to Esterline Corporation, Broadview, Ill., a corporation of Delaware
Filed Apr. 27, 1966, Ser. No. 545,708
Int. Cl. B24b 49/00, 51/00
U.S. Cl. 51—165         9 Claims

ABSTRACT OF THE DISCLOSURE

A surface grinder has a power-operated drive mechanism for raising and lowering the grinding wheel carriage relative to the work table. This drive mechanism has a clutch and a friction drive from a motor to the clutch. When the carriage reaches the end of its travel, the friction drive and motor continue to operate but the clutch itself slips, preventing transmission of power to parts of the drive mechanism coupled thereto. With the motor shut off, a calibrated hand wheel is used to operate the drive mechanism. The hand wheel shaft drives through the clutch and motor, which provide a slight friction drag to facilitate fine adjustments of the carriage at the work.

---

This invention relates to power driven tool-positioning mechanisms, and more particularly to a power-operated mechanism for use in positioning the grinding wheel carriage of a surface grinder.

It is an object of the present invention to provide a power-operated mechanism for raising and lowering the spindle housing or carriage of a surface grinder in order to rapidly retract the grinding wheel from the work, or to rapidly lower the grinding wheel to a position adjacent to the work so that thereafter fine adjustments for engaging the work and making subsequent cuts in the work may be made by the machinist through a calibrated handwheel. The present invention, because of its low cost and unique features, is particularly suitable for small surface grinders and results in increased production from those machines as well as a reduction in the effort required on the part of machinists to operate the machines. Furthermore, the mechanism of the present invention renders it economical to modify existing surface grinders.

It is a further object of the present invention to provide a mechanism of the type stated in which there is a friction clutch in the power train to the grinding wheel carriage that slips when the carriage reaches the end of its travel or otherwise engages an obstruction so that damage to the power drive mechanism or to other parts of the machine is avoided. This also is advantageous in that machinists need not be concerned about stopping the machine just when the limit of travel of the carriage has been reached.

It is also an object of the present invention to provide a machine of the type stated in which the drive from the source of power, for instance an electric motor, to the clutch is through reduction friction gearing which is maintained in constant engagement even though the motor is not in operation. The handwheel is also maintained in constant driving connection with the power drive so that when the handwheel is turned to make fine adjustments in the position of the carriage, there is a drive through the clutch and motor. The friction and inertia of these parts create a slight drag on the handwheel that aids the machinist in moving the handwheel a small fraction of a revolution (for instance, the equivalent of moving the carriage about .0001″) and also aids in keeping the handwheel, and hence the carriage, in its adjusted position.

The attainment of the above and further objects of the present invention will be apparent from the following description taken in conjunction with the accompanying drawing forming a part thereof.

Figure 1:
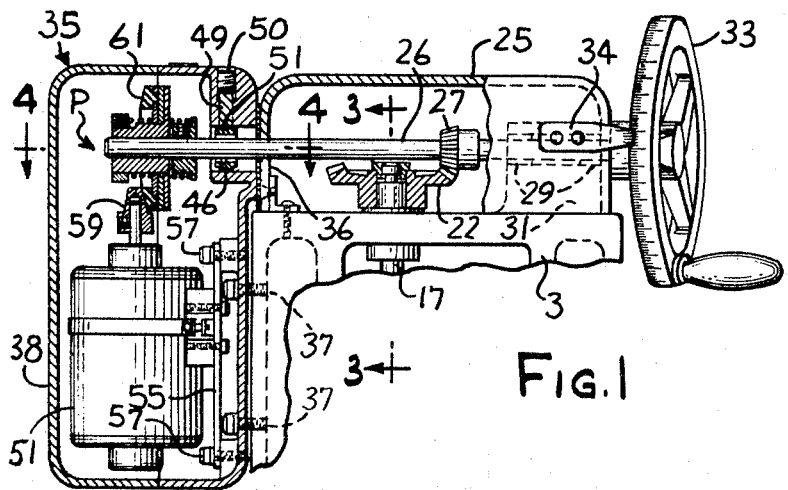
FIG. 1 is a fragmentary vertical sectional view of a surface grinder constructed in accordance with and embodying the present invention.
Figure 2:
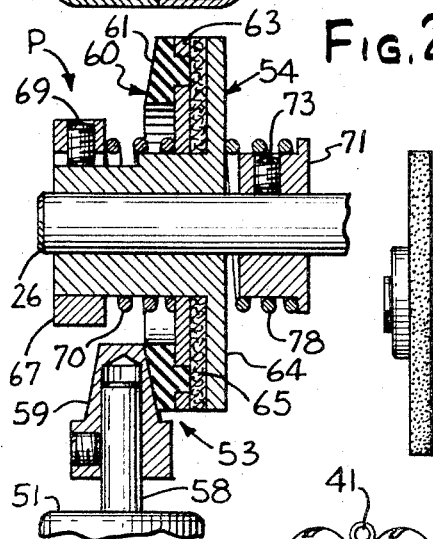
FIG. 2 is a sectional view of a portion of the structure of FIG. 1.
Figure 3:
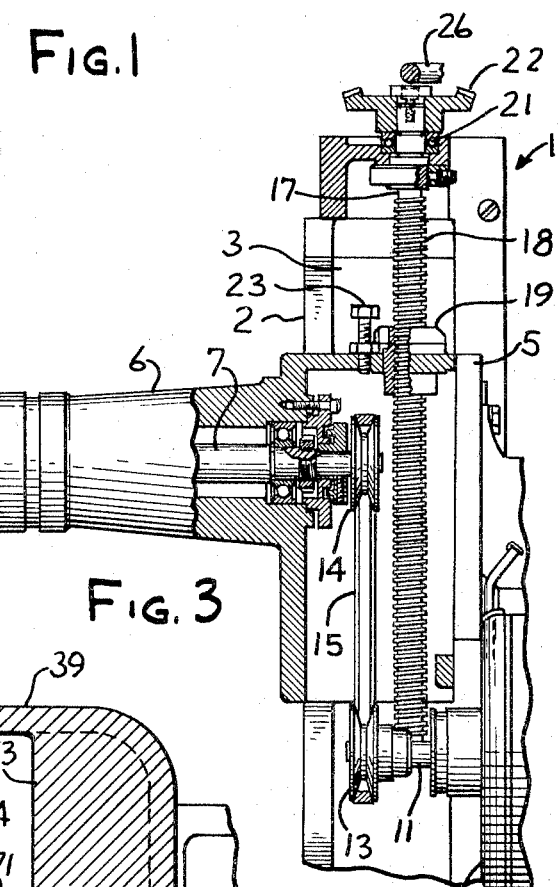
FIG. 3 is a fragmentary sectional view taken along line 3—3 of FIG. 1.
Figure 4:
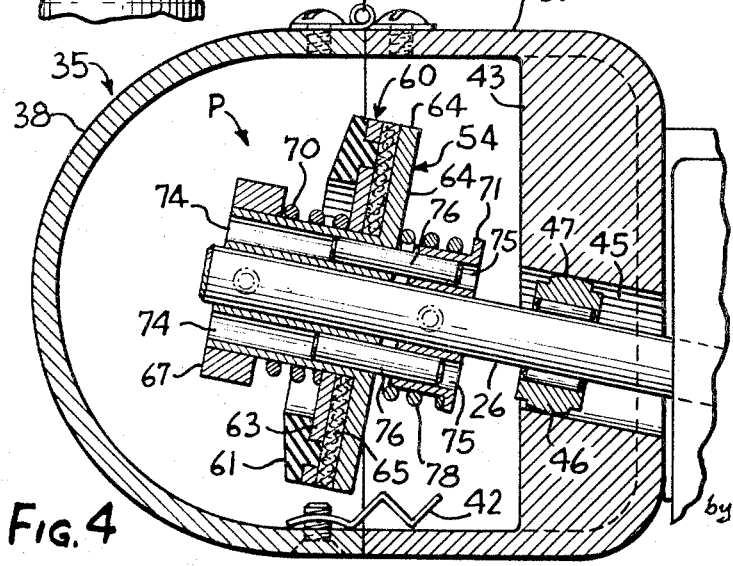
FIG. 4 is a fragmentary sectional view on an enlarged scale taken along line 4—4 of FIG. 1 but with the motor and its mounting being omitted from the figure.

Referring now in more detail to the drawing, 1 designates a surface grinder having upstanding frame or column 2. The column 2 has a slideaway 3 upon which a carriage 5 is mounted for vertical sliding movement toward and away from the usual work-supporting feed table (not shown) that is at the base of the column underlying the carriage 5. The carriage 5 includes a spindle housing 6 that suitably journals a horizontal spindle 7 upon which a grinding wheel 9 is mounted in the usual manner. The carriage 5 also supports for movement therewith an electric motor 10 having a shaft 11 with a pulley 13 mounted thereon. The pulley 13 drives a pulley 14 mounted on the inner end of the spindle 7 through a belt 15. Thus the motor 10 may drive the grinding wheel 9 continuously, irrespective of the position of elevation of the carriage 5 on the slideway 3 and also while the carriage 5 is being shifted along the slideway 3.

For driving the carriage, a vertical screw-shaft 17 is journaled in the column 2 and projects through the carriage 5. For most of its length the shaft 17 is formed with a thread 18 that is in threaded engagement with a nut 19 rigidly mounted on the upper side of the carriage 5. On the upper end of the shaft 17 adjacent to an upper shaft bearing 21, is a bevel gear 22 which, when turned, operates the screw-shaft 17 to raise and lower the carriage 5. An adjustable screw 23 may be threaded into the carriage 5 and be adapted to abut an upper end portion of the column 2 to constitute an upper stop for the carriage 5.

On the upper end of the column 2 is a gear housing 25 that receives the bevel gear 22 and a portion of a shaft 26. A bevel pinion 27 is rigidly mounted on the shaft 26 and is in driving engagement with the bevel gear 22. The shaft 26 has a portion thereof journaled in bearings 29, 29 located in a boss 31 on the upper end of the column 2. The shaft 26 projects outwardly of the adjacent end of the gear housing 25 for receiving a peripherally calibrated handwheel 33 which is rigidly mounted on the shaft 26. The calibrated handwheel 33 cooperates with an index gage or calibrated marker 34 so that the handwheel 33 may be rotated in measured increments in order to shift the carriage 5 a desired amount.

The shaft 26 also extends through an opening 36 in the gear housing 25 that is opposite to the handwheel 33 for connection with a power drive P that is suitably enclosed in a housing 35, the latter being secured to one side of the upper end of the column 2 by screws 37. The housing 35 is longitudinally split to provide two sections 38, 39 that are secured together along adjacent sides by a longitudinal hinge 41. A spring clip 42 on the housing section 38 maintains the latter in closed position with the housing section 39. The wall of the housing section 39 that is adjacent to the gear housing 25 is formed with a boss 43 having a hole 45 that receives the shaft 26 as well as a self-aligning bearing 46 for the shaft 26. The outer surface 47 of the bearing 46 is made spherical so that the bearing 46 can center itself with respect to the axis of the shaft 26 when the machine is assembled. The bearing 46 is retained in its adjusted position by a bearing lock plug 49, a set screw 50 and a radial pin 51, the latter extending into both the plug 49 and bearing 46.

The power drive mechanism P comprises generally an electric motor 51, a reduction-gear friction drive 53 and a clutch 54 that is mounted on the part of the shaft 26 that is within the housing 35. The motor 51 is suitably bolted to a mounting plate 55 which is, in turn, secured by screws 57 to the housing section 39. Mounted on the motor shaft 58 is a bevelled, conically tapered friction drive gear 59 that drives a friction disc 60 having a conically tapered rubber-like ring 61 that is molded to and backed by a disc blank 63 and with portions of the rubber-like ring 61 projecting through the disc blank 63 to ensure a firm engagement therewith. This driven disc 60 is mounted for free rotation on the hub of a clutch driver 64 that is on the shaft 26. The driven disc 60 drives the clutch driver 64 through a friction disc 65, which may be of a material of the type used for friction clutch facings. A collar 67 is rigidly mounted on the clutch driver hub 64 by a setscrew 69, and a coil-compression clutch spring 70 is interposed between the collar 67 and the driven disc 60 to apply pressure from the driven disc 60 through the friction disc 65 to the clutch driver 64.

Adjacent to but axially spaced from the clutch driver 64 is a shaft driver 71 that is secured to the shaft 26 by setscrew 73. The clutch driver 64 and shaft driver 71 have aligned pairs of holes 74, 75, with each pair of holes being 180° apart. These holes 74, 75 receive pins 76, 76 by which the drive from the clutch driver 64 is transmitted to the shaft driver 71 and, in turn, to the shaft 26. A coil-compression drive spring 78 encircles the shaft driver 71 and applies pressure through the clutch driver 64 in opposition to the clutch spring 70 to the driven disc 62 ensuring that the friction drive between the driver 59 and disc 60 is maintained in substantially nonslipping engagement at all times.

In use, the motor 51 may be operated to drive the shaft 26 through the clutch 54 and thus raise and lower the carriage 5. For example, when the carriage is in its uppermost position, the motor 51 may be operated in the appropriate direction to lower the carriage 5 until the grinding wheel 9 is close to the workpiece. Thereafter, the motor 51 may be shut off and the carriage 5 further lowered by the handwheel 33. When the handwheel is operated to lower the carriage 5, rotation of the shaft 26 results in a drive through the clutch 54 to the motor 51. This creates a slight drag on the handwheel 33 and is of value to the machinist in both making small adjustments in the position of the carriage and also in maintaining the carriage in its selected position.

To raise the grinding wheel 9 from the work, the motor is operated in the reverse direction. When the carriage 5 reaches its upper limit of travel, it will stop and the shaft 26 will cease to rotate. However, with the motor 51 operating, there will be slippage between the friction disc 65 and the adjacent face of the clutch driver 64. The motor 51 will, however, continue to drive the driven disc 60 until the motor is switched off.

Thus, in the present invention, the torque-transmitting capability of the clutch need only be sufficient to raise and lower the carriage since it is desired that the clutch slip if the carriage encounters an obstruction.

It will be understood that for operation of the motor selectively in either direction, suitable conventional switching and related circuitry may be provided.

In compliance with the requirements of the patent laws, I have herein shown and described a preferred embodiment of the present invention. It should be understood, however, that the invention is not limited to the precise form herein shown and described, the same being merely illustrative of the principles of the invention.

What is new and desired to be secured by Letters Patent is:

1. In a machine tool comprising a slideway and a tool carriage on the slideway, means for reciprocating the carriage along the slideway; said means comprising a manually operable drive and a power-operated drive, both connected to said carriage and each operable when the other is operated, said power-operated drive comprising a clutch that slips when the tool carriage is restrained by an obstruction from movement on the slide but permits the source of power to the clutch to continue operation, said manually operable drive being calibrated to facilitate shifting the carriage in measured increments when the power-operated drive is inoperative.

2. A machine tool according to claim 1 having first shaft means in driving connection with the carriage, said power-operated drive comprising second shaft means driven from said source of power through said clutch, and the manually operable means comprises said second shaft means.

3. A machine tool according to claim 1 in which there is a friction drive from the source of power to the clutch which remains engaged upon operation of said manually operable drive.

4. A machine tool according to claim 1 in which the power-operated drive comprises a shaft and with said clutch having disc members on the shaft.

5. In a machine tool having a slideway and a tool carriage on the slideway, means for reciprocating the carriage along the slideway; said means comprising a shaft, a motor, a friction drive member driven by the motor, a driven member rotatable on the shaft and in frictional engagement with said drive member, means on the shaft for driving the shaft from said driven member, said last means comprising torque-transmitting portions and means for applying substantially constant pressure to said portions in an amount sufficient to drive the shaft but insufficient to prevent slippage between said portions when the carriage is restrained by an obstruction from movement on the slide, and means for maintaining said driving and driven members in substantially slip-free driving engagement when there is slippage between said torque-transmitting portions.

6. A machine tool according to claim 5, further including calibrated manually operable means in driving connection with said shaft for shifting the carriage when the motor is not in operation so that during operation of said manually operable means the motor is driven through said friction drive.

7. A machine tool according to claim 5 in which the last-mentioned means comprises a spring on the shaft that applies axial pressure to said driven member to hold it against said friction drive member.

8. In a grinding machine having a frame, a carriage having a grinding wheel spindle, means for moving the carriage along the frame to displace the grinding wheel spindle, and means movable with said carriage for rotating the spindle, said means for moving the carriage along the frame comprising a first rotatable shaft having means in driving connection with said carriage so that rotation of said first shaft moves said carriage, a second rotatable shaft in driving connection with said first shaft and extending at an angle thereto, a motor, a friction drive member driven by the motor, and a clutch through which said second shaft is driven; said clutch including a driven member rotatable on the second shaft and in frictional engagement with said drive member and means on the second shaft for driving the second shaft from said driven member, said last-named means having torque-transmitting portions that slip when the carriage is restrained from movement by an obstruction, means for maintaining said driving and driven members in substantially slip-free driving engagement when there is slippage between said torque-transmitting portions and also when the motor is not in operation, and calibrated manually operable means in driving connection with said first and second shafts for shifting the carriage in selected increments when the motor is not in operation so that during operation of said manually operable means, the motor is driven through the friction drive, said manually operable means including a handwheel connected to said second shaft.

9. A machine tool according to claim 1 in which the clutch has cooperating torque-transmitting elements and means pressing the elements together with substantially constant pressure.

References Cited

UNITED STATES PATENTS

| | | | |
|---|---|---|---|
| 952,588 | 3/1910 | Stevens | 51—165.07 X |
| 1,298,395 | 3/1919 | Proctor. | |
| 1,927,007 | 9/1933 | Whittles | 51—165.01 X |
| 2,520,868 | 8/1950 | Whiting | 51—165.07 X |
| 2,927,403 | 3/1960 | Holland et al. | 51—92 |
| 3,097,455 | 7/1963 | Flohr | 51—165 |

DONALD R. SCHRAN, *Primary Examiner.*

G. WEIDENFELD, *Assistant Examiner.*